United States Patent
Graneau

[15] 3,654,520
[45] Apr. 4, 1972

[54] HIGH VOLTAGE SURGE DIVERTER
[72] Inventor: Peter Graneau, Concord, Mass.
[73] Assignee: Interpace Corporation, Parsippany, N.J.
[22] Filed: Apr. 20, 1971
[21] Appl. No.: 135,588

[52] U.S. Cl. ..............................................317/61, 317/67
[51] Int. Cl. ...................................................H02h 9/06
[58] Field of Search.................313/DIG. 5, 231; 317/61, 67

[56] References Cited

UNITED STATES PATENTS 2,374,527  4/1945  Earle ........................................317/67
3,226,593  12/1965  Pittman..............................317/61 X Primary Examiner—James D. Trammell
Attorney—Charles E. Baxley

[57] ABSTRACT

A new technique for diverting high-voltage surges due to lightning or switching operations from a power line to ground. The surge diverting discharge takes place across the surface of solid dielectric insulators placed in an evacuated space inside a dielectric tube. Metallic ion shields are provided which intercept the discharge path and uphold a voltage between the electrodes of the diverter. The device has a more stable triggering level than prior art lightning arresters and it prevents the flow of power followthrough currents.

5 Claims, 3 Drawing Figures

Patented April 4, 1972 3,654,520

PETER GRANEAU
INVENTOR.

BY
*Henry M. Fuller*
ATTORNEY

HIGH VOLTAGE SURGE DIVERTER

This invention relates to high-voltage electric power transmission and apparatus, and in particular provides apparatus for diverting electrical charge, inherent in a high-voltage surge, from a power line to ground. The voltage surge may be due to a lightning stroke or transient induction from current switching operations. Devices performing this duty are often referred to as lightning arresters.

High-voltage transformers and cables often have to be connected to unshielded overhead power line conductors. Lightning may strike the overhead line or the magnetic field surrounding the line may change rapidly on account of current switching. Both these events will produce voltage surges that travel along the line to transformers and cables which are insulated with oil impregnated paper. To protect the oilpaper insulation, it is common practice to connect lightning arresters to the overhead line terminations. When a voltage surge travels along the line and reaches a lightning arrester an electric arc is struck in the arrester which limits the voltage across this device to a safe level for the oil-paper insulation in the adjacent apparatus.

Conventional arresters employed for this duty comprise three essential elements. (1) A shedded and gas filled porcelain tube which separates the high and low potential connections and houses the other two elements. (2) One or more spark gaps. (3) One or more nonlinear resistors which increase their resistances with increasing current. Under normal conditions the spark gap or series of gaps provides electrical insulation between the power line and ground. When overvoltage on the line reaches the flashover level of the spark gaps, arcs will be established which, at least initially, represent short-circuits across the gaps. However, the current limiting resistors do not permit unrestricted current flow so that a certain voltage is held across the arrester. This sequence of events diverts the high-voltage surge to ground. When the transient phenomenon is over the arcs across the gaps will be maintained by the operating voltage of the power line until this approaches a zero in the 60 Hz wave. After the arcs have been extinguished in this way, the arrestor becomes again an insulator.

Conventional lightning arresters have two disadvantages. Firstly, the trigger voltage at which the arcs are struck is not constant and varies unpredictably over a quite wide range of voltages. This is typical for electrical discharges in gases. Therefore, the voltage level at which the arrester will fire with certainty is often two or three times as high as the guaranteed voltage withstand level. Therefore, the apparatus to be protected by the arrester has to be insulated to withstand two or three times the operating voltage. The second disadvantage of conventional lightning arresters is that the arcs are entrapped by collisions with the surrounding gas molecules and, therefore, cannot disperse quickly. This causes the flow of power follow-through currents, producing a disturbance on the power system and possibly causing damage in the arrester.

Accordingly, it is an object of this invention to provide an improved apparatus for diverting high-voltage surges from an overhead power line to ground which has a relatively stable voltage triggering threshold and does not permit the flow of power follow-through current.

Still another object of the invention is to provide such apparatus for surge diversion in combination with the terminations of the power apparatus that is being protected against the surges, e.g. transformers and cables.

These and other objects of this invention are accomplished by allowing the surge to discharge to ground in an evacuated space along solid dielectric surfaces which are interrupted by metallic ion shields. The solid dielectric surfaces, which take part in the discharge formation, are responsible for the stable voltage triggering threshold. The vacuum space surrounding the dielectric surfaces in combination with the metallic ion shields prevents the flow of power follow-through currents. The apparatus typically includes a housing in the form of a porcelain, glass or ceramic tube with normal weather shedding on the outside. Porcelain, glass or ceramic insulators between metallic ion shields separate the diverter electrodes inside the housing.

For a more complete understanding of the practical application of this invention, reference is made to the appended drawings in which.

Figure 1:
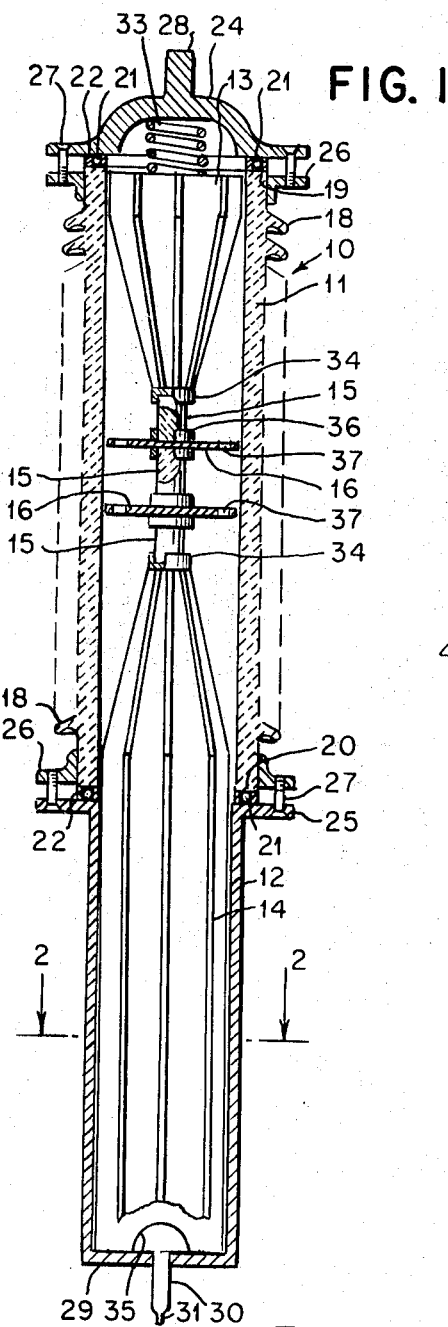
FIG. 1 is a longitudinal section of a device in accordance with this invention for diverting high-voltage surges on an electric power transmission line.

With reference particularly to FIG. 1, there is illustrated a high-voltage surge diverter 10 suitable for connection to one conductor of an aerial high-voltage transmission line and to ground to function as a lightning arrester.

Diverter 10 basically includes a housing formed in two sections, a hard dielectric tube 11 which is joined to a metal tank 12. In addition diverter 10 includes a high potential electrode 13 and a low potential electrode 14, separated by a series of hard dielectric insulators 15 which retain a series of ion shields 16 between the electrodes 13 and 14.

Tube 11, which is preferably ceramic, is provided exteriorly with the usual weather shedding 18 required for outdoor operation. The ends 19 and 20 of tube 11 are ground flat and sealed by means of metal O-rings 21 and retaining rings 22 to, respectively, a top cap 24 and a flange 25 on the open, adjacent end of tank 12. Compression is applied to the seals by flanges 26 cemented to the ends 19 and 20 of tube 11 which threadedly receive bolts 27 passed through openings in the perimeter of cap 24 and in flange 25.

It will be noted that cap 24 is bell-shaped and centrally carries an upstanding terminal lug 28 for connection typically to a high-voltage conductor of an aerial transmission line and that the end of tank 12 remote from tube 11 is closed at 29 such that the enclosure is vacuum-tight. A copper tube 30 is ported through closure 29 to permit connection of the interior of the housing of diverter 10 to evacuation apparatus to evacuate the enclosure. After evacuation tube 5 is sealed by pinching it together as at 31.

Considering the closed end 29 as the bottom of diverter 10, inside the evacuated enclosure there are resting upon each other in sequence from the bottom, low potential electrode 14, three flashover insulators 15 separated by two ion shields 16 and high potential electrode 13. This assembly is pressed together by a spring 33 placed between the upper end of high potential electrode 13 and the underside of top cap 24.

Figure 2:
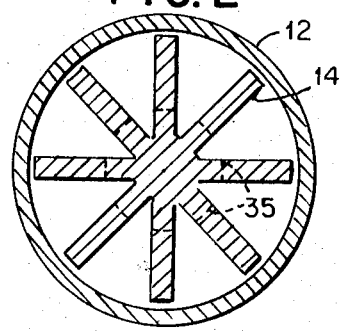
FIG. 2 is a section along line 2—2 in FIG. 1.

The two electrodes 13 and 14 are of finned construction as indicated by the section of electrode 14 shown in FIG. 2. The purpose of the finned construction is to expose as much metallic surface as possible to facilitate the rapid condensation of metal vapor generated during the discharge. Many metals and alloys are suitable for this purpose, but titanium and stainless steel are preferred metals. The finned construction may be achieved by welding metal sheets together.

Referring again to FIG. 1 it will be noted that electrode 14 extends through the length of tank 12 into tube 11 while electrode 13 is retained entirely in the upper end of tube 11, such that insulators 13 and shields 16 are centrally positioned in tube 11. It will be further noted that within tube 11 the confronting ends of electrodes 13 and 14 are tapered to just greater than the diameter of insulators 15 which are generally of cylindrical shape. The confronting ends of electrodes 13 and 14 carry metal cups 34 in which the adjacent insulators 15 are received. In addition a semi-circular cut-out 35 is provided in the lower end of electrode 14 to ensure easy evacuation through tube 30 which, until it is pinched off, functions as a pumping port.

Ion shields 16 are metal discs, titanium and stainless steel being the preferred materials. Rings 36 are welded coaxially on the upper and under sides of discs 16 to provide cup-like seats for flashover insulators 15. Ion shields 16 fit losely in tube 11 and near their rims are provided with holes 37 to facilitate evacuation and diffusion of vapors generated during discharges through diverter 10.

Circular cylindrical pieces of hard dielectric material are provided as flashover insulators 16. Many materials are suitable for this purpose. The preferred materials are alumina ceramics, porcelain and glass.

For installation on a power system terminal 28 has to be connected to the power line and tank 12 must be metallically bonded to a ground conductor.

When diverter 10 is assembled, evacuated and installed, the evacuated space between the confronting ends of electrodes 13 and 14 forms a discharge gap between which a discharge will take place whenever the voltage on the transmission line exceeds a predetermined maximum voltage. Such maximum voltage is accurately fixed by the electrical breakdown voltage in vacuum and the spacing between electrodes 13 and 14. It is obvious that the spacing between flanges 26 must be substantially greater than the spacing in air required to prevent breakdown at such predetermined maximum at which diverter 10 is intended to function.

When discharge does occur in diverter 10 power follow-through current does not flow because the discharge is extinguished as soon as the triggering mechanism ceases because metal vapors formed during the discharge are trapped on the surfaces of electrodes 13 and 14 and are not available to support a continuous arc at a voltage lower than the predetermined breakdown voltage of diverter 10. At the same time, during normal operation when no overloads are present on the power line, ion shields 16 interrupt the flow of stray electrons escaping from electrodes 13 and 14 such that they cannot travel sufficiently far to achieve velocities under the high gradient field present which would ionize gas molecules inevitably present in the evacuated enclosure. The presence of ionized gas, which might tend to lower the breakdown voltage, is thereby minimized. Consequently diverter 10 provides an extremely stable lightning arrester having a reliable and accurately determinable breakdown voltage.

Figure 3:
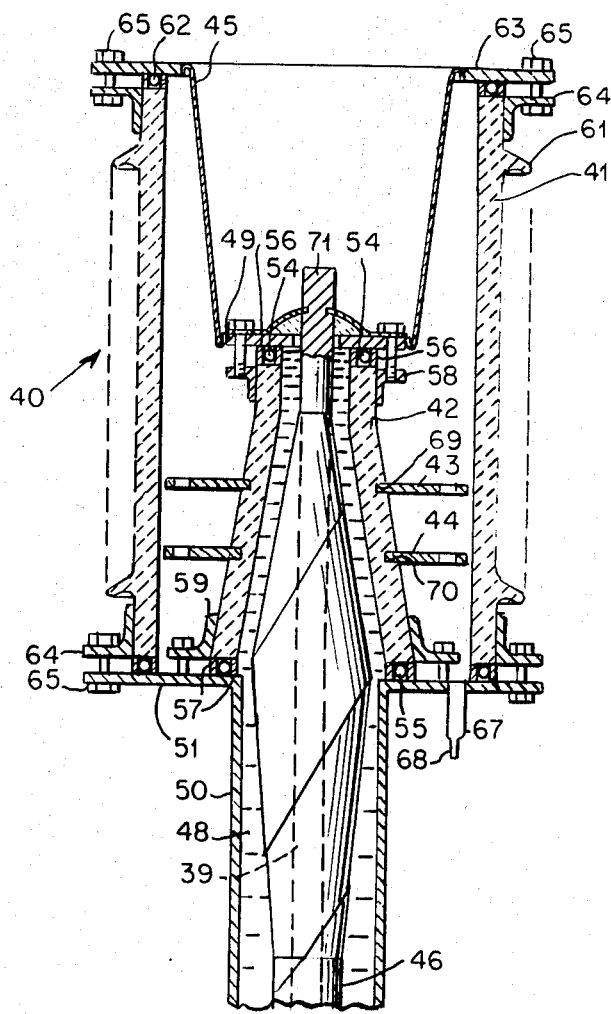
FIG. 3 is a view similar to that of FIG. 1 of another device in accordance with this invention in which a high-voltage diverter is part of a termination for an insulated high-voltage conductor.

Referring more particularly to FIG. 3 there is shown a diverter 40 in accordance with this invention suitable for terminating an insulated conductor 39 in air. Generally diverter 40 includes a hard dielectric tube 41, a hollow, conical insulator 42, ion shields 43 and 44, a metallic membrane 45 and a top cap 49, as well as portions of the termination of conductor 39.

High-voltage copper conductor 39 is insulated by wrapped-on paper tapes 46 which are impregnated with and immersed in oil 48. Conductor 39 is soldered, braced or welded to the inside of top cap 49. Insulating oil 48, which may be pressurized, is contained by a cylindrical metallic enclosure 50 which terminates with a large flange 51. Oil 48 is also contained about the end of conductor 39 by conical ceramic insulator 42 and top cap 49, as insulator 42 rests with its larger end on flange 51 registering with the opening into enclosure 50 and as conductor 39 extends through insulator 42 with top cap 49 resting against the smaller end of insulator 42. The joints between top cap 49, insulator 42 and flange 51 are sealed by metal O-ring seals 54 and 55 with retaining rings 56 and 57. Flanges 58 and 59 which are cemented to insulator 42 and bolts are used to apply pressure to the O-ring seals 54 and 55.

Ceramic tube 41 which is positioned on flange 51 enclosing insulator 42 is provided with weather shedding 61 on the outside. It is sealed with metal O-rings 62 to flange 51 of the metal enclosure 50 and to an annular top plate 63. Flanges 64, which are cemented to ceramic tube 41, permit the application of pressure to seals 62 by means of bolts 65. Metallic membrane 45 is welded to top plate 63 and top cap 49 to close the space between tube 41 and insulator 42. Its shape allows a certain amount of longitudinal extension for thermal expansion and easy sealing of the assembly. The space between ceramic tube 41 and insulator 42 is evacuated through a copper tube 67 in flange 51 which, after evacuation, is sealed by pinching it together at 68.

Annular metallic ion shields 43 and 44 are set into grooves 69 and 70 in spread apart along the length of conical ceramic insulator 42. To assemble shields 43 and 44 on ceramic insulator 42 they have to be made in halves which are riveted together after having been placed in position. Holes 45 in ion shields 43 and 44 facilitate evacuation and the diffusion of vapors generated during discharges. Preferred materials for all metallic parts exposed to the vacuum are titanium and stainless steel.

In operation, the terminal of the combined termination and surge diverter 40 is the exposed end 71 of of conductor 39 extending through cap 49. End 71 must be connected to an air insulated power line. The transmission line current flows through the oil-paper insulated copper conductor 39. When a high-voltage surge reaches terminal 71 this will cause a discharge from top cap 49 to flange 51 of grounded metal enclosure 50 along the outer surface of the conical ceramic insulator and through the ion shields 43 and 44.

Generally the behavior of diverter 40 is much the same as that of diverter 10, and diverter 40 similarly provides the functions of lightning arrester having a reliable and stable discharge potential with minimum follow-through current, once the disturbing mechanism is dissipated. It will be evident that cup 49 functions as high potential electrode 13 in FIG. 1 while flange 51 functions as low potential electrode 14.

I claim:

1. A device for diverting electrical charge associated with a high-voltage surge from a high-voltage conductor to a grounded structure, which device includes:
   a. means defining an evacuated space including solid dielectric housing means;
   b. high potential electrode means in said space;
   c. low potential electrode means in said space;
   d. said low and high potential electrode means being spaced apart and confronting each other within said space in said dielectric housing means to define a discharge gap;
   e. solid dielectric insulator means positioned in said gap between said electrode means;
   f. a metallic ion shield positioned in said space within said housing means about said insulator means and spaced from said electrode means to intercept the natural path of electrical discharge over the surfaces of said insulator means in said gap; and
   g. means electrically isolated by said dielectric housing means for providing separate external electrical connections to said low and high potential electrode means.

2. A device according to claim 1 in which a said electrode means is finned.

3. A device according to claim 1 in which said insulator means includes a plurality of separate insulators and in which a said ion shield is retained between an adjacent pair of said insulators.

4. A device according to claim 1 in which said insulator means includes an insulator adapted to retain a said ion shield thereon.

5. A device according to claim 1 in which said insulator means is hollow and is adapted to accommodate an insulated conductor there through.

* * * * *